United States Patent [19]

Brunner et al.

[11] 4,079,107

[45] Mar. 14, 1978

[54] PROCESS FOR THE PRODUCTION OF EXTRA SOFT POLYVINYL CHLORIDE FOAM PLASTICS

[75] Inventors: Emil Brunner; Alfred Huber, both of Mettmenstetten, Switzerland

[73] Assignee: Lonza, Ltd., Gampel, Valais, Switzerland

[21] Appl. No.: 619,914

[22] Filed: Oct. 6, 1975

[30] Foreign Application Priority Data

Oct. 4, 1974 Switzerland .................... 013312/74

[51] Int. Cl.$^2$ ............................................ B29D 27/00
[52] U.S. Cl. ........................................ 264/50; 264/54; 264/55; 264/DIG. 60
[58] Field of Search ..................... 264/55, 51, 50, 54, 264/DIG. 60

[56] References Cited

U.S. PATENT DOCUMENTS

| 2,498,074 | 2/1950 | Feldman | 264/55 |
| 2,525,880 | 10/1950 | Feldman | 264/55 |
| 2,525,965 | 10/1950 | Smith | 264/55 |
| 2,590,156 | 3/1952 | Carpentier | 264/55 X |
| 2,751,627 | 6/1956 | Lindemann | 264/55 X |
| 2,768,407 | 10/1956 | Lindemann | 264/55 X |

OTHER PUBLICATIONS

Platzer, Norbert A. J. "Plasticization and Plasticizer Processes," Norbert A. J. Platzer, Symposium Chairman, Washington, D. C., American Chemical Society, 1965, pp. 146-152.

*Primary Examiner*—Philip Anderson
*Attorney, Agent, or Firm*—Virgil H. Marsh

[57] ABSTRACT

The process for the production of closed-cell, extra soft polyvinylchloride foam plastics having improved volume stability at elevated temperatures. The process includes heating a plastisol or plastigel comprised of a plasticizer and foaming agent containing polyvinyl chloride or vinyl chloride copolymerizate in a pressure mold at a pressure of up to 300 atm. to a temperature of 150° to 180° C. for 1 to 2 hours. The plastigel or plastisol is cooled, at an unchanged closing force of the press of said pressure mold, to a temperature of 20° to 70° C. The plastigel or plastisol is removed from the pressure mold, a crude foam plastic forming. The crude foam plastic is heated under a gas pressure of 2 to 10 atm. to a temperature of 140° to 170° C. The crude foam plastic is cooled at said pressure of 2 to 10 atm. to a temperature of 100° to 130° C. The pressure is lowered to atmospheric pressure, the foam plastic simultaneous expanding. The resultant foam plastic will not shrink or expand more than 5 percent after storage for one week at 60° C.

15 Claims, No Drawings

PROCESS FOR THE PRODUCTION OF EXTRA SOFT POLYVINYL CHLORIDE FOAM PLASTICS

BACKGROUND OF THIS INVENTION

1. Field of this Invention

This ivnention relates to a process for the production of closed-cell, extra soft polyvinyl chloride foam plastics having improved volume stability at higher temperatures, from polyvinyl chloride or vinyl chloride copolymerizates, containing plasticizers and foaming agents, in the form of plastigels and plastisols.

2. Prior Art

It has been known to produce foam plastics from thermoplastic plastics in a first step, by heating plastic plastigels or plastisols, containing foaming agents and plasticizers, in pressure molds to temperatures of 150° to 180° C. for the purpose of gelling and decomposition of foaming agents, cooling subsequently to 20° to 80° C., and, in a second step, expanding by heating without pressure the crude foam plastic removed from the pressure molds.

The disadvantage of the products obtained according to such a process that one will indeed obtain soft, but taut, i.e., little flexibility, foam plastics, the volume stability of which, particularly for use in life jackets and bodies with buoyancy, leaves much to be desired. The shrinkage which occurs when such products are stored for seven days at 60° C. is about 8 to 20 percent.

BROAD DESCRIPTION OF THIS INVENTION

An object of this invention is to provide a process that avoids the problems of the known process and that produces a foamed plastic which has very high volume stability, yet is flexible. Other objects and advantages of this invention are set forth herein or are obvious herefrom to one ordinarily skilled in the art. The process of this invention achieves the objects and advantages of this invention.

This invention involves a process for the production of closed-cell, extra soft polyvinylchloride foam plastics having improved volume stability at elevated temperatures. This invention includes heating a plastisol or plastigel comprised of a plasticizer- and foaming agent-containing polyvinyl chloride or vinyl chloride copolymerizate in a pressure mold at a pressure of up to 300 atm. to a temperature of 150° to 180° C. for 1 to 2 hours. The plastigel or plastisol is cooled, at an unchanged closing force of the press of said pressure mold, to a temperature of 20° to 70° C. The plastigel or plastisol is removed from the pressure mold, a crude foam plastic forming. The crude foam plastic is heated under a gas pressure of 2 to 10 atm. to a temperature of 140° to 170° C. The crude foam plastic is cooled at the pressure of 2 to 10 atm. to a temperature of 100° to 130° C. The pressure is lowered to atmospheric pressure, the foam plastic simultaneously expanding.

DETAILED DESCRIPTION OF THIS INVENTION

The task of this invention is to eliminate the disadvantages of the prior art products and processes of making such. This invention achieves that task — particularly , the process of this invention produces foam plastics having a low volumentric weight of about 40 to 80 kg/m$^3$, and a volume stability of which, in the case of storage for seven days at 60° C., shows less than 5 percent shrinkage or expansion.

According to this invention such task is achieved (and such a product obtained) by heating the plastigel or plastisol in pressure molds under a pressure of up to 300 atm. to a temperature of 150° to 180° C., cooling to 20° to 70° C., heating the foam plastic after removing such from the pressure mold, again in a compression vessel under gas pressure of 2 to 10 atm. to a temperature of 140° to 170° C., cooling under such pressure to a temperature of 100° to 130° C. by lowering the gas pressure to standard pressure and at the same time expanding the foam body. The resultant foam plastic has a good degree of flexibility.

Plasticizer-containing polyvinyl chlorides and vinyl chloride copolymerizates and graft polymers are used as the starting material. The following are examples of copolymerizable monomers (for use with the polyvinyl chloride or vinyl chloride): vinyl esters, such as, vinyl acetate, vinyl propionate and vinyl laurate; acrylic acid and methacrylic acid esters, such as, ethyl hexyl acrylate, methacrylic acid methyl ester and methacrylic acid butyl ester; esters of fumaric and maleic acids; olefins, such as ethylene, propylene; furthermore chlorinated monomers such as vinylidene chloride (but other than vinyl chloride). Such ester moieties (and olefins) usually have from 1 to 12 carbon atoms.

The polymers are used in the form of plastigels and plastisols. Plastigels are plasticizer-containing plastic mixtures (plastisols), which are treated with bracing (stiffening) additives, for example, aluminum laurate, aluminum stearate, magnesium stearate, calcium carbonate, calcium silicate, lead stearate, zinc stearate, colloidal silicic acid, and as a result are converted into a dough-like form. Plastigels can be molded and do not change their shape during gelatinization or fusion. Such plastigels can be used either as such or in a pre-gelatinized state, for example by brief heating to temperatures which lie below the decomposition point of the foaming agent. Preferably plastisols are used in the process according to the invention.

The known, high boiling compounds such as phthalic acid esters, for example, dioctyphthalate and dibutyl phthalte, phosphate plasticizers, for example, tricresyl phosphate, alkyl sebacates and esters of multivalent alcohols, also solvents, can be used in the formulations.

As foaming agents, the known compounds can be used: for example, azoiso butyric acid dinitrile, azodicarboxilic amide, benzolsulfohydrazide, diazoaminobenzol and dinitrosopentamethylenetetramine, as well as compounds which split off carbon dioxide. Naturally substances can still be added which regulate the decomposition temperature and speed of the foaming agents.

One or more plasticizer can be used; and one or more foaming agent can be used.

The plasticizer-and foaming agent-containing copolymerizate is preferably filled into rigid pressure molds, for example, of a multilayer press, and is heated to temperatures of 150° to 180° C., preferably 160° to 170° C., and is kept at this temperature for 1 to 2 hrs. During this time gelatinization and decomposition of foaming agents take place, whereby pressures of 30 to 300 atm., preferably 100 to 200 atm., are built up. The pressures prevent the body from premature expansion and make possible the utmost regular distribution of the gas in the thermoplastic body. Subsequently at an unchanged closing force of the press, which indeed must guarantee the continued closure of the molds during the heating phase, the plastic mass is cooled to 20° to 70° C. preferably to 30° to 50° C. Then the press is opened and the crude foam plastics are removed from the pressure mold. After this first step the crude foam plastics are put into a compression vessel (tank) for the second and third steps of the process. The dimensions of the compression vessel, as opposed to the pressure molds, are considerably greater, to be sure in such a way that the crude foam plastics can expand into the finished foam plastics in the third step without touching the wall.

It is preferred to use an autoclave for this.

In the second step, the crude foam plastic are again heated up under gas pressure of 2 to 10 atm. The temperature employed in this step lies at 140° to 170° C., preferably 150° to 160° C. This temperature is maintained for ½ to 1 hr., and is then lowered to 100° to 130° C. During this entire work process the gas pressure is maintained.

Subsequently, in a third step of the process, the expansion to the finished foam plastic takes place by lowering the gas pressure to standard (atmospheric) pressure.

It is preferably in the second step to introduce steam into the pressure vessel in order to achieve relative degrees of humidity of 10 to 40 percent.

Air is preferably used as the compression gas, but other inert gases can be used.

The process of this invention thus represents a three step process:

(i) Gelatinization; decomposition of foaming agent and cooling.

(ii) Reheating under gas pressure to temperatures close to the gelatinization temperature and cooling.

(iii) Expanding.

On the contrary, the hitherto known foaming processes are two step processes with:

(i) Gelatinization, decomposition of foaming agent and cooling.

(ii) Expanding.

According to the process of this invention, light foam plastics, covered all around by a skin and having a volumetric weight between 40 and 80 kg/m³ are obtained, which are distinguished by a particularly great degree of softness. They are softer and more flexible than foam plastics, which are produced in accordance with known processes. This refers naturally to equal quantities of plasticizers being used. The foam plastics produced according to this invention are distinguished particularly by a very high volume stability, i.e., they hardly change their volume during storage at an elevated temperature. Thus, for example, they only change in volume in the case of 7 days of storage at 60° C. by at most 5 percent, which is a test used for foam plastics in life jackets.

Before the second and third processing steps, the crude foam plastics can be split. One will then, in the end, also obtain thinner foam plastic plates (sheets) covered all around with skin, the thickness of which is independent of the height of the pressure mold.

Of course, crude foam plastics, which are obtained from punch molds, can also be subjected to the second and third processing steps.

As used herein, all parts, ratios, proportions and percentages are on a weight basis, unless otherwise stated or otherwise obvious to one ordinarily skilled in the art.

EXAMPLE 1

100 kg of PVC paste type LONZA PE 704,
50 kg of phosphate plasticizer,
50 kg of dibutylphthalate,
20 kg of azo dicarboxylic amide,
0.5 kg of pigment, and
6 kg of liquid Ba/Cd stabilizer were processed in a known manner in the dissolver into a plastisol. The plastisol was filled (placed) into a rigid pressure mold, which however was not quite filled. Subsequently this was heated during 2 hrs. to 164° C. and was cooled over a one half hour period to 50° C. Then the crude foam plastic was removed from the mold. Subsequently it was put into an autoclave and preheated to 110° C. The temperature was raised to 160° C. and the pressure was raised to 5 atm. with the simultaneous introduction of steam. After 1 hour it was cooled to 120° C. over a 40 minute period, and the gas pressure was then lowered to 0 atm.

The foam plastic body obtained had a raw density of 50 kg/m³. It was distinguished by particularly great softness and slight shrinkage at an elevated temperature.

EXAMPLE 2

A mixture of:
100 kg of PVC LONZA Type B 3,
50 kg of dioctylphthalate,
50 kg of dibutylphthalate,
18 kg of azo dicarboxilic amide,
0.3 kg of titanium dioxide,
0.4 kg of pigment, and
5 kg of neutral lead stearate was processed in the double trough kneader at 30° C. into a homogenous plastigel. The plastigel was extruded into a skin by means of a screw extruder having a special feed screw. This was cut into blocks, which were somewhat smaller than the pressure molds in which they were placed. The hollow spaces were put under a nitrogen pressure of 10 atm. after closing of the molds. Then this was heated for 2 hrs. to 165° C., the nitrogen was allowed to flow out (escape) through a valve to 0 excess pressure, and this was then cooled for ½ hour to 50° C. The crude foam plastics obtained were then put into an autoclave, as in Example 1, for a second heating under gas pressure and subsequent expansion.

The foam plastic bodies obtained had a raw density of 55 kg/m³ and were likewise distinguished by great softness and low shrinkage at an elevated temperature.

What is claimed is:

1. The process for the production of a closed-cell, extra soft polyvinylchloride foam plastic product having improved volume stability at elevated temperatures which comprises (a) heating a plastisol or plastigel comprised of a plasticizer- and a foaming agent-containing polyvinyl chloride or vinylchloride copolymerizate in a pressure mold at a pressure of up to 300 atm. to a temperature of 150° to 180° C., (b) cooling said plastigel or plastisol, at an unchanged closing force of the press or said pressure mold, to a temperature of 20° to 70° C., (c) removing said cooled plastigel or plastisol from said pressure mold as a crude foam plastic preform, (d) heating said crude foam plastic preform under a gas pressure of 2 to 10 atm. to a temperature of 140° to 170° C., (e) cooling said crude foam plastic preform at said pressure of 2 to 10 atm. to a temperature of 100° to 130° C., and (f) lowering said pressure to atmospheric pressure, said foam plastic preform simultaneously expanding to form said closed-cell extra soft polyvinyl chloride product, step (a) achieving gelation and the decomposition of the foaming agent, step (d) imparting said extra softness and said improved volume stability at elevated temperatures to said polyvinylchloride foam plastic preform and steps (c) and (f) achieving expansion under light pressure.

2. The process of claim 1 wherein the copolymerizable monomer forming said copolymerizate with said vinyl chloride or said polyvinyl chloride is a vinyl ester, an acrylic acid ester, a methacrylic ester, an olefin or a chlorinated monomer other than vinyl chloride.

3. The process of claim 1 wherein the starting material is a plastisol.

4. The process of claim 1 wherein said heating of step (a) is to a temperature of 160° to 170° C.

5. The process of claim 1 wherein, after heating step (a) is effected, said temperature and pressure being maintained for 1 to 2 hours.

6. The process of claim 1 wherein a pressure of 100° to 200° C. is achieved in step (a).

7. The process of claim 1 wherein said cooling of step (b) is to a temperature of 30° to 50° C.

8. The process of claim 1 wherein said heating of step (d) is to a temperature of 150° to 160° C.

9. The process of claim 1 wherein after heating step (d) is effected, said temperature being maintained for 0.5 to 1 hour.

10. The process of claim 1 wherein said pressure in step (d) is achieved by means of air and wherein said step (d) is achieved in a pressure vessel.

11. The process of claim 10 wherein steam is introduced into said pressure vessel to obtain a relative humidity of 10 to 40 percent.

12. The process of claim 1 wherein, in step (a), said plastisol is filled into said pressure mold in the form of a heavy foam, obtained by mechanical beating in air.

13. The process of claim 1 wherein said crude foam plastic preform obtained from step (c) is split and said split pieces are subjected to steps (d) to (f).

14. The process of claim 1 wherein, in step (a), said pressure mold is completely filled with said plastisol or plastigel before said heating is started.

15. The process of claim 1 wherein more than one of said pressure molds are used.

* * * * *